Patented Aug. 23, 1949

2,479,874

UNITED STATES PATENT OFFICE 2,479,874

PREPARATION OF ALKALI METAL SALTS OF PURE PENICILLIN

Murray Senkus, Terre Haute, Ind., assignor to Commercial Solvents Corporation, Terre Haute, Ind., a corporation of Maryland No Drawing. Application September 4, 1945, Serial No. 614,439

6 Claims. (Cl. 260—302)

This invention relates to a method for the preparation of alkali metal salts of penicillin and more particularly to a method for preparing such alkali metal salts from pure ammonium penicillin salt.

In my copending application, Serial No. 575,555, filed January 31, 1945, I have described a method for preparing pure ammonium penicillin in crystalline form from impure penicillin material.

In that application it was proposed to convert the pure ammonium salt to other pure metallic salts by a multiple extraction process. Such a process is tedious and time consuming and moreover results in considerable loss of penicillin material in the conversion steps.

I have now found that the ammonium salt may be converted simply and directly to the desired alkali metal salts in high yields and with virtually no decomposition or destruction of penicillin activity by my process in which an aqueous solution of pure ammonium penicillin is treated with a soluble basic alkali metal compound and the ammonia is volatilized and driven off under controlled conditions such that the basicity of the solution is maintained below a pH at which the penicillin activity is destroyed and the alkali metal radical replaces the ammonia to form the desired penicillin salt.

In carrying out my invention, I mix pure ammonium penicillin and the appropriate basic alkali metal compound with water preferably using a minimum quantity of water and a quantity of alkali metal ion approximately stoichiometrically equivalent to the ammonium in the ammonium penicillin. The alkali metal compound may be any soluble alkali metal compound such as sodium, potassium and lithium carbonates and bicarbonates. The solution of ammonium penicillin and alkali metal compound is then distilled under vacuum to drive off the ammonia from the ammonium penicillin whereupon the penicillin attaches to the positive alkali metal ion supplied in the form of the basic metallic compound. The pure alkali metal penicillin thus formed may then be utilized in solution or may be desiccated in any desired known manner such as by freezing and drying from the frozen state, crystallization from suitable solvents, etc.

The basicity of the compound used to supply the replacing metal should not be so high as to cause destruction of the penicillin material. Such destruction occurs in water solutions above about pH 9; and a safe operating range is therefore somewhat below this figure. Basic compounds which ordinarily have pH values in aqueous solutions somewhat above pH 9, can be used, provided however, that suitable control is exerted to maintain the pH of the solution as a whole below pH of about 9, while at the same time avoiding the addition to the solution of contaminating material which will remain in the pure metallic salt when formed. Thus, the basic compounds used should have a negative radical of such character as to leave on decomposition, no extraneous remainders in solution, such negative radicals as the carbonates and bicarbonates being illustrations of suitable negative radicals. Control of the pH of basic compounds ordinarily having pH values only slightly above 9 can be accomplished by passing a stream of carbon dioxide through the solution during the volatilization of the ammonia and the concomitant reaction of the penicillin with the alkali metal compound. Compounds which are normally strongly basic, such as sodium hydroxide and the like are not adapted to control by this means, as even the limited time of contact of the penicillin material with the strong base before the carbon dioxide controlling action could become effective would result in serious or even complete destruction of the penicillin activity.

In any case, the solution in which the ammonium penicillin is converted to a penicillin metallic salt by volatilization of the ammonia and reaction of the penicillin with the replacing ion, should be maintained below pH 9 and preferably in the neighborhood of pH 6.7 to 8.5 during the reaction.

When ammonia is no longer evolved, the reaction is complete. The solution may then be recovered in any desired manner for example by evaporating under vacuum, freezing and drying from the frozen state resulting in a dry pure penicillin salt, which may be used as such or recrystallized from appropriate solvents if desired.

Penicillin salts which may be prepared in accordance with my invention include the alkali metal salts such as lithium, sodium, and potassium. The replacing compound may be either the carbonates or bicarbonates.

The following examples will further illustrate my invention.

Example I

To .872 gram of pure, crystalline ammonium penicillin assaying 1700 Oxford units of penicillin activity per milligram was added 0.215 gram of sodium bicarbonate, and the mixture was dissolved in 100 ml. of water resulting in a solution having a pH of 8. The solution was distilled under a reduced pressure of 50 mm. and carbon dioxide gas was bubbled through the solution during the distillation. When ammonia ceased to be evolved, indicating complete conversion of the ammonium penicillin to sodium penicillin, the distillation was stopped and the aqueous solution concentrated to 56 ml. by evaporation at reduced pressure. The concentrated solution had a potency concentration of 24,000 units per ml.

A 50 ml. portion of the concentrated solution was frozen and dried under vacuum from the frozen state, yielding .7796 gram of pure sodium penicillin which assayed 1570 Oxford units per milligram.

Example II

A mixture of 0.0850 gram of dry sodium bicarbonate and 0.3000 gram of dry pure ammonium penicillin assaying 1680 Oxford units per milligram, and being a mixture of penicillins G, F, and K was dissolved in 200 ml. of water, forming a solution having a pH of 7.2. The solution was distilled under reduced pressure of about 38 mm., at a pot temperature of about 30° C. until substantially all the ammonia and $CO_2$ had been driven off, and the volume of solution had been reduced to 18 ml. The remaining solution was frozen and dried under vacuum from the frozen state and yielded 300 milligrams of pure sodium penicillin assaying 1670 Oxford units per milligram.

Example III

A mixture of 0.1400 gram of sodium bicarbonate and 0.6000 gram of pure ammonium penicillin having an assay of 830 Oxford units of penicillin activity per mg. and indicated by differential assay to be about 95% penicillin I, the remainder G and F was dissolved in 200 ml. of water to form a solution having a pH of 7.2. The solution was distilled under reduced pressure of 38 mm. and a pot temperature of about 30° C. until substantially all the ammonia and carbon dioxide had been driven off, and the volume of the solution reduced to 30 ml. The solution was then frozen, dried under vacuum from the frozen state, and yielded .562 gram of pure sodium penicillin of the type described above, assaying 815 Oxford units per milligram.

Example IV

A solution of .4000 gram of potassium carbonate in 70 ml. of water was prepared, and into this was passed carbon dioxide until the pH reached 6.7. In this solution, 2.000 grams of pure ammonium penicillin assaying 1800 Oxford units per milligram was dissolved, and the solution distilled under reduced pressure of about 40 mm., while continuing to pass carbon dioxide through the solution at a pot temperature between 30 and 34° C. until substantially all the ammonia had been driven off, and the volume of the solution reduced to 56 ml. The remaining solution was frozen, and dried under vacuum from the frozen state, and yielded 2.000 grams of pure potassium penicillin assaying 1800 Oxford units per milligram.

Example V

In 10 ml. of 0.2418 normal lithium bicarbonate solution at pH 7.2 was dissolved 1.000 gram of pure ammonium penicillin assaying 1800 Oxford units per mg., and the volume of solution brought to 100 ml. by the addition of water. The solution was then distilled under reduced pressure of 44 mm. and a pot temperature of 35° C. until substantially all the ammonia had been driven off and the volume had been reduced to 71 ml. The remaining solution was frozen and dried under vacuum from the frozen state and yielded 1.0150 grams of pure lithium penicillin assaying 1775 Oxford units per milligram.

While the above describes the preferred embodiments of my invention, it will be understood that departures may be made therefrom within the scope of the specification and claims.

What is claimed is:

1. In a process for preparing pure alkali metal salts of penicillin from pure ammonium penicillin, the steps which comprise adding to the ammonium penicillin, water and an alkali metal compound selected from the group consisting of the carbonates and bicarbonates, distilling the mixture to volatilize and remove the ammonia while maintaining the pH of the solution below about pH 9.

2. In a process for preparing pure alkali metal salts of penicillin from pure ammonium penicillin, the steps which comprise adding to the ammonium penicillin, water and an equivalent proportion of an alkali metal compound selected from the group consisting of the carbonates and bicarbonates, distilling the mixture to volatilize and remove the ammonia while maintaining the pH of the solution below about pH 9, and thereafter recovering the pure alkali metal penicillin.

3. In a process for preparing pure alkali metal salts of penicillin from pure ammonium penicillin, the step which comprises volatilizing the ammonia from the ammonium penicillin in aqueous solution in the presence of an equivalent proportion of an alkali metal bicarbonate, while maintaining the pH of the mixture below about 9.

4. In a process for preparing pure sodium penicillin from pure ammonium penicillin, the steps which comprise adding to pure ammonium penicillin, water and an equivalent proportion of sodium bicarbonate and distilling the mixture under reduced pressure to volatilize and remove the ammonia from the solution, and thereafter recovering the pure sodium penicillin.

5. In a process for preparing pure potassium penicillin from pure ammonium penicillin, the steps which comprise adding to pure ammonium penicillin, water and an equivalent proportion of potassium bicarbonate and distilling the mixture under reduced pressure to volatilize and remove the ammonia from the solution; and thereafter recovering the pure potassium penicillin.

6. In a process for preparing pure lithium penicillin from pure ammonium penicillin, the steps which comprise adding to pure ammonium penicillin, water and an equivalent proportion of lithium bicarbonate and distilling the mixture under reduced pressure to volatilize and remove the ammonia from the solution; and thereafter recovering the pure lithium penicillin.

MURRAY SENKUS.

REFERENCES CITED

The following references are of record in the file of this patent:

Chemical Abstracts, vol. 1 (1907), page 898.
Mellor, Modern Inorganic Chemistry, 1939, page 397.
Abraham, British Journal of Experimental Path., pp. 108–109, June 1942, vol. 23.
Science, vol. 96, No. 2479, July 3, 1942, pp. 20–21.
Welch, Proc. Soc. Exp. Biol. Med., April 1944, pp. 246–248.
Nature, Oct. 7, 1944, No. 3910, page 459.